No. 661,704. Patented Nov. 13, 1900.
D. M. PFAUTZ.
AUTOMOBILE.
(Application filed Aug. 24, 1900.)

(No Model.) 4 Sheets—Sheet 1.

No. 661,704. Patented Nov. 13, 1900.
D. M. PFAUTZ.
AUTOMOBILE.
(Application filed Aug. 24, 1900.)

(No Model.) 4 Sheets—Sheet 2.

No. 661,704. Patented Nov. 13, 1900.
D. M. PFAUTZ.
AUTOMOBILE.
(Application filed Aug. 24, 1900.)
(No Model.) 4 Sheets—Sheet 3.

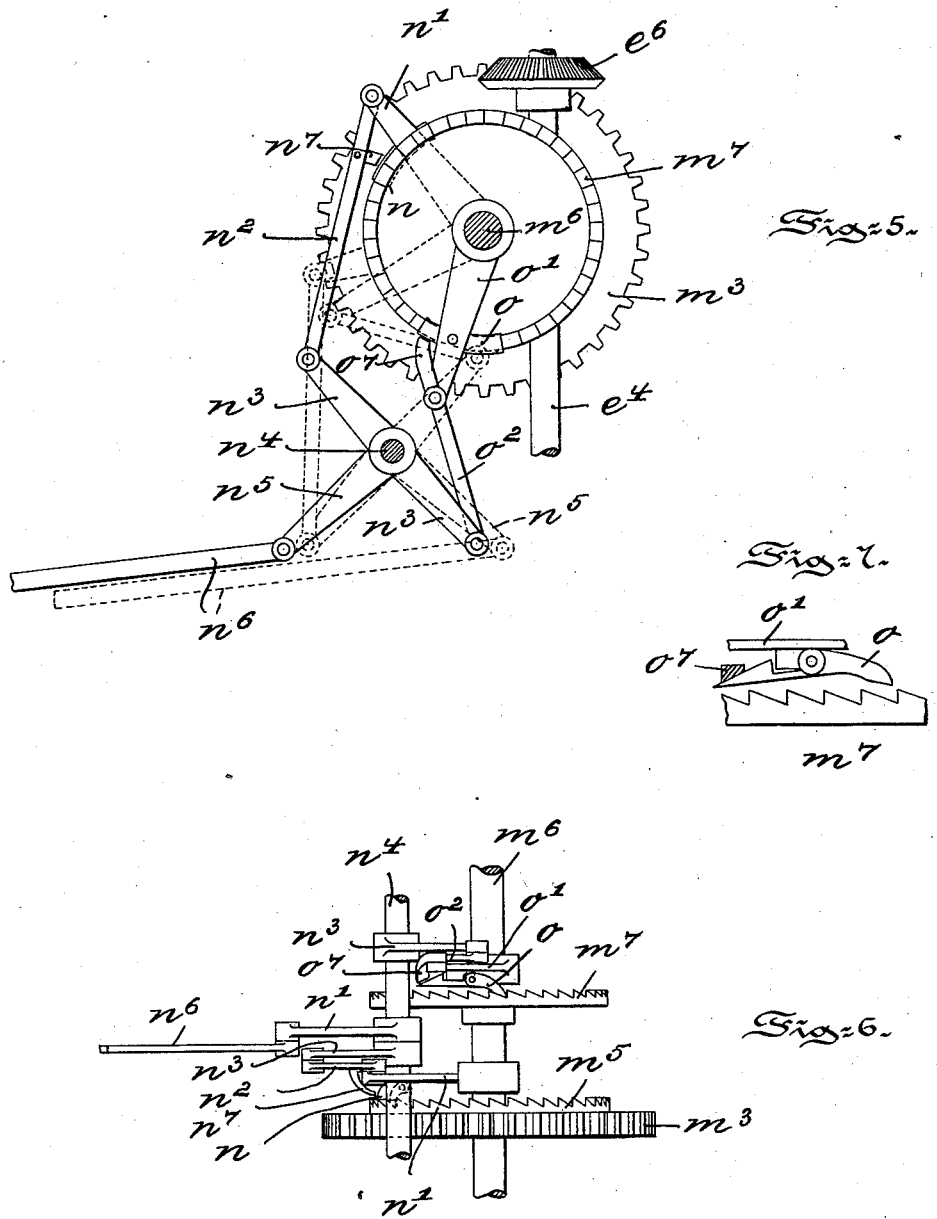

UNITED STATES PATENT OFFICE.

DANIEL M. PFAUTZ, OF PHILADELPHIA, PENNSYLVANIA, ASSIGNOR OF ONE-HALF TO HENRY W. AMERLING, OF SAME PLACE.

AUTOMOBILE.

SPECIFICATION forming part of Letters Patent No. 661,704, dated November 13, 1900.

Application filed August 24, 1900. Serial No. 27,871. (No model.)

*To all whom it may concern:*

Be it known that I, DANIEL M. PFAUTZ, a citizen of the United States, residing at Philadelphia, (Germantown,) in the county of Philadelphia and State of Pennsylvania, have invented certain new and useful Improvements in Automobiles, of which the following is a specification.

My invention has relation to that class of self-propelled vehicles known as "automobiles," and in such connection it relates to the construction and arrangement of the driving mechanism for such a vehicle.

The principal objects of my invention are, first, to provide in an automobile a means whereby the driving mechanism is steadied to prevent, during the propulsion of the vehicle, the jarring or rocking of the body and truck of the vehicle, and, second, to provide in an automobile, in conjunction with the means for self-propulsion, a means whereby the vehicle may be propelled by hand either in conjunction with the driving mechanism or independently thereof.

My invention, stated in general terms, consists of an automobile constructed and arranged in substantially the manner hereinafter described and claimed.

The nature and scope of my invention will be more fully understood from the following description, taken in connection with the accompanying drawings, forming part hereof, in which—

Figure 1:
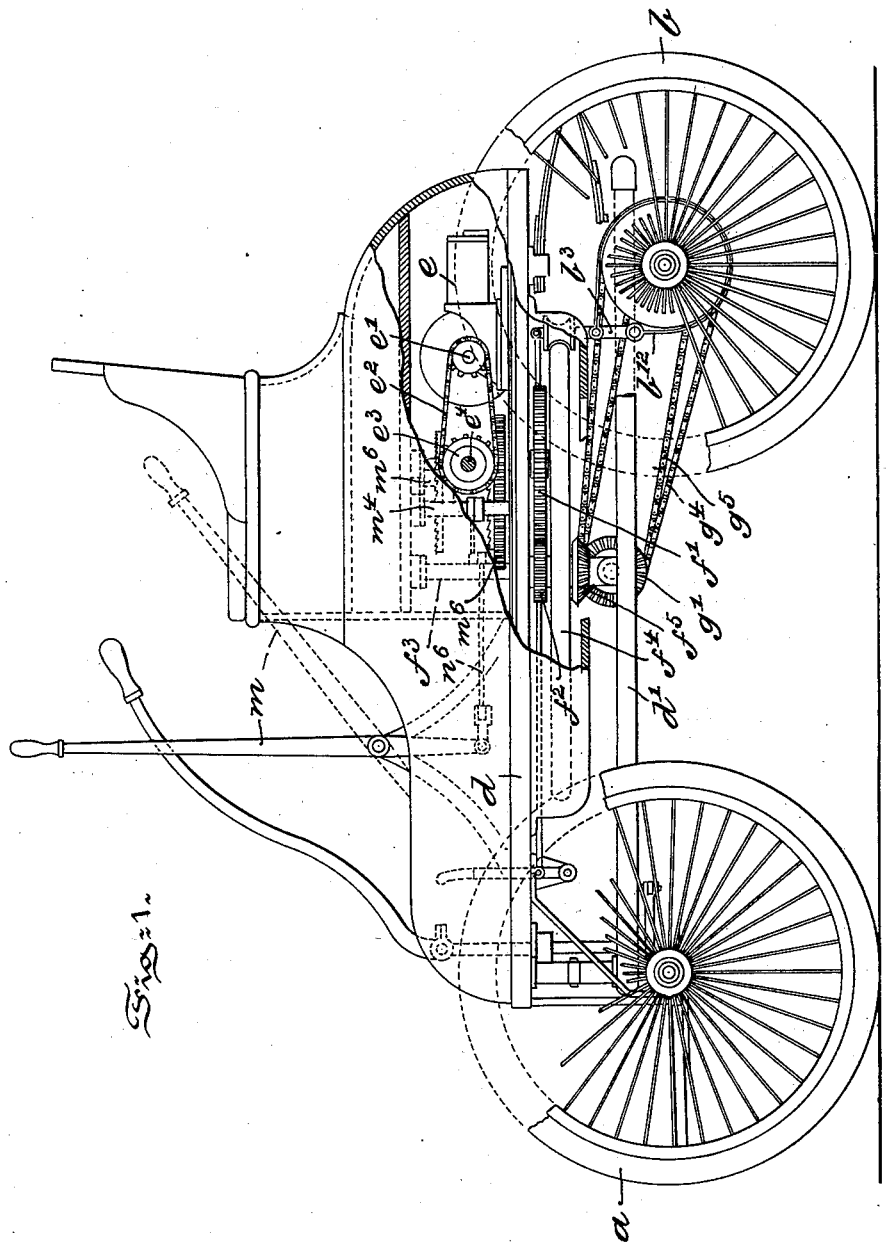
Figure 2:
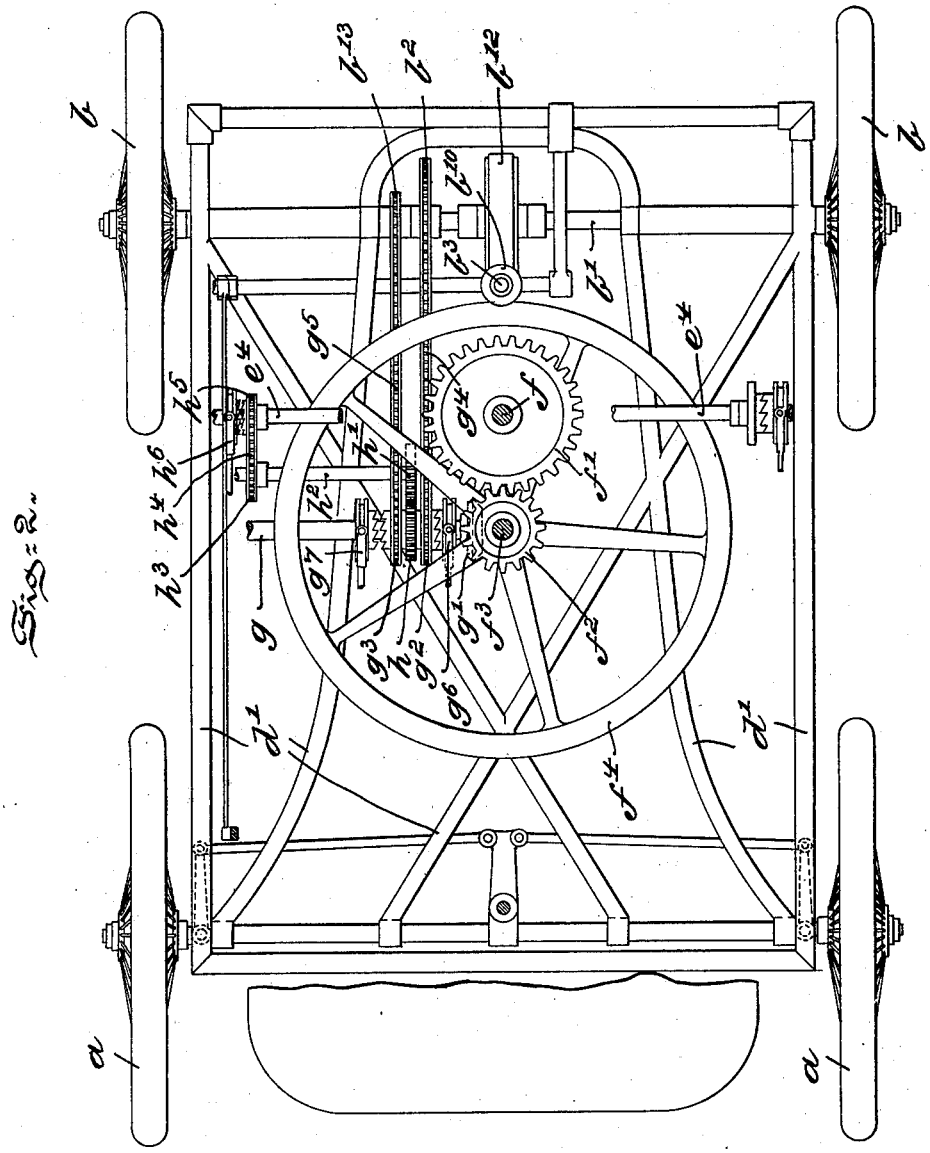
Figure 3:
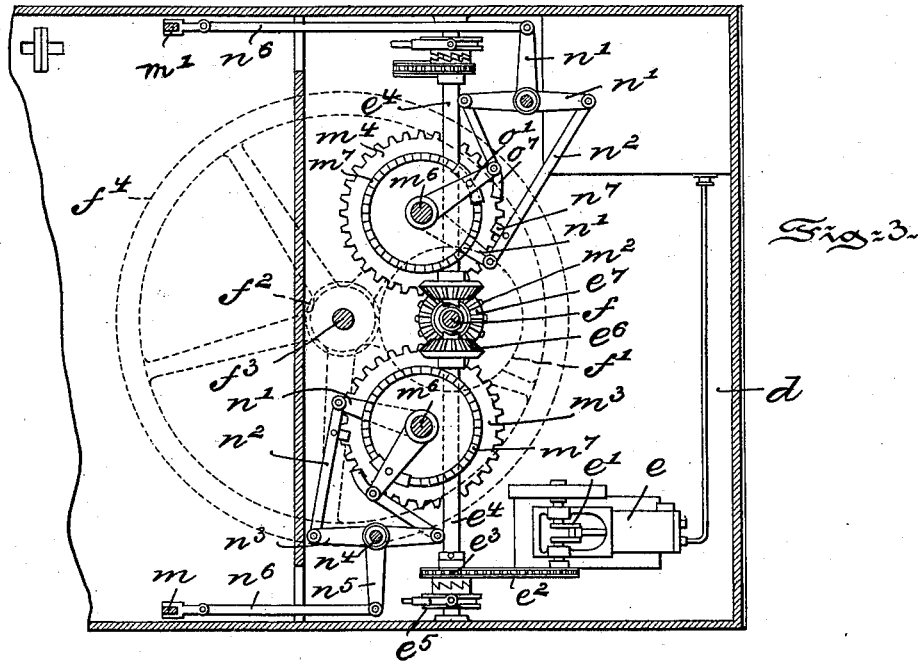
Figure 4:
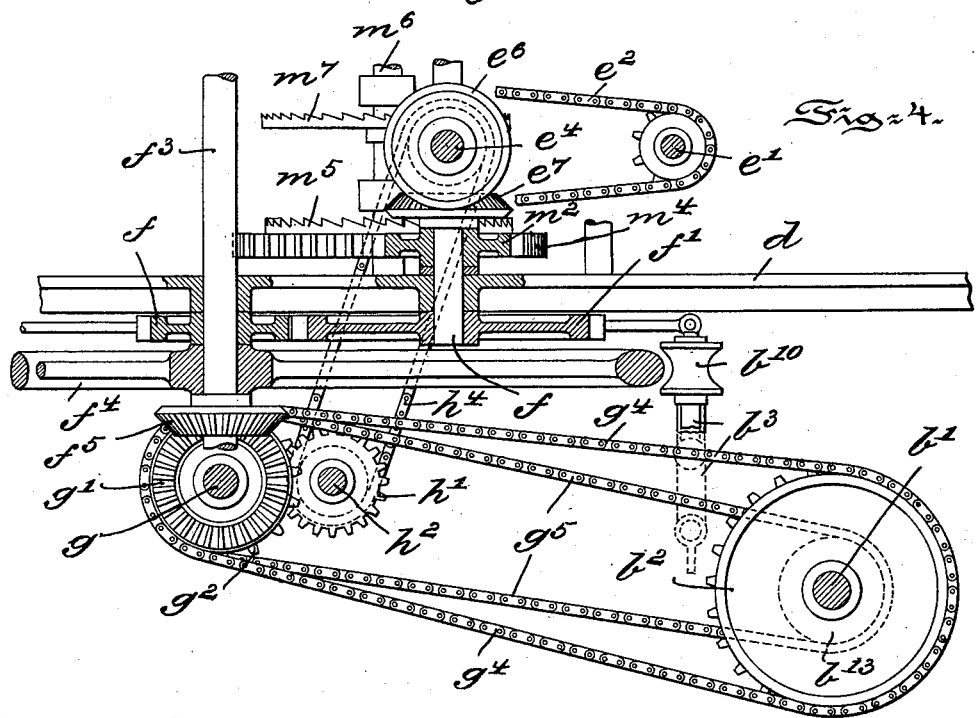

Figure 1 is a side elevational view, partly broken away, of an automobile embodying the main features of my invention. Fig. 2 is a top or plan view of the same with the body and floor of the vehicle removed and certain other parts broken away to more clearly illustrate the invention. Fig. 3 is a top or plan view of that part of the mechanism located above the floor of the vehicle. Fig. 4 is a vertical sectional view, enlarged, of the driving mechanism. Fig. 5 is a top or plan view, enlarged, illustrating in detail a portion of the mechanism for enabling the vehicle to be propelled by hand. Fig. 6 is a side elevational view of Fig. 5, and Fig. 7 is a detail view of one of the pawls and ratchets of the hand propelling mechanism and of the means for releasing the pawl from the ratchet.

Referring to the drawings, $a\ a$ represent the front or steering wheels of the vehicle, and $b\ b$ the rear or positively-driven wheels thereof. The manner of turning the wheels $a\ a$ is old and well known and detailed description thereof is not deemed necessary. The shaft or axle $b'$ of the wheels $b\ b$ is likewise of an old construction and is controlled by a band-brake $b^{12}$, operated by a lever $b^3$ and connecting mechanism in the usual manner. The floor $d$ of the vehicle is supported upon a suitable truck-frame $d'$. Upon the floor $d$ and preferably in rear of the vehicle is supported a motor $e$, of any preferred form or type. The crank-shaft $e'$ of this motor $e$ is connected by a chain or band $e^2$ and intervening sprocket $e^3$ with a horizontally-disposed shaft $e^4$ and drives the same when a clutch $e^5$, fixed to the shaft $e^4$, is thrown into engagement with the hub of the sprocket $e^3$. On the shaft $e^4$ is secured the two miter-gears $e^6$, which mesh with a miter-gear $e^7$, secured to the vertically-disposed shaft $f$. At or near the bottom of this shaft is secured a gear-wheel $f'$, meshing with a pinion $f^2$, secured to the shaft $f^3$, also vertically disposed. To the shaft $f^3$ is secured a large fly-wheel $f^4$, and below the fly-wheel $f^4$ a miter-gear $f^5$ is secured to the shaft $f^3$. This gear $f^5$ meshes with a miter-gear $g'$, secured to a horizontally-arranged shaft $g$. On the shaft $g$ and normally out of engagement therewith are two sprocket-wheels $g^2$ and $g^3$, of varying diameters and numbers of teeth. One sprocket $g^2$ is connected by a chain $g^4$ with a sprocket $b^2$, located on the shaft or axle $b'$, and is adapted thereby to drive the said shaft at a high rate of speed, while the other sprocket $g^3$ is connected by a chain $g^5$ with a sprocket $b^{13}$, located on the said shaft or axle $b'$, and is adapted thereby to drive the said shaft at a low rate of speed. Either sprocket $g^2$ or $g^3$ may be brought into engagement with the shaft $g$ by means of a clutch $g^6$ or $g^7$, which may be operated at the will of the operator through suitable mechanism. (Not shown.) The motion of the horizontal shaft $e^4$ is thus transmitted by suitable mechanism to the vertical shaft $f$, thence to the vertical shaft $f^3$, to which the fly-wheel $f^4$ is secured, and thence to the horizontal shaft $g$, from which it may be transmitted through either sprocket $g^2$ or $g^3$ and connecting parts to the rear axle or shaft $b'$ to drive the wheels $b$ $b$ at varying speeds. The use of the two vertical shafts $f$ and $f^3$ intermediate of the two horizontal shafts $e^4$ and $g$ and the location on the vertical shaft $f^3$, which is approximately in the center of the vehicle of a flywheel $f^4$, serve to check the jarring or rocking of the vehicle when the driving mechanism is operating and the vehicle is being propelled.

To cause the vehicle to be propelled backward, a movement to the sprocket $g^3$ in a reverse direction to that normally imparted thereto by the shaft $g$ is secured as follows: Between the two sprockets $g^2$ and $g^3$ is located an intermediate toothed collar $h$, which is secured directly to the low speed or gear sprocket $g^3$ and disconnected with the high-speed sprocket $g^2$. This toothed collar $h$ is in mesh with a pinion $h'$, located on a short horizontal shaft $h^2$, at one end of which is secured a sprocket $h^3$, connected by a chain $h^4$ with a sprocket $h^5$, loosely supported on the shaft $e^4$. This sprocket $h^5$ may be locked to the shaft $e^4$ by means of the clutch $h^6$, operated by mechanism (not shown) at the will of the operator. When now both sprockets $g^2$ and $g^3$ have been disengaged from their shaft $g$ and the said shaft is rotating without driving the rear axle, the clutch $h^6$ is operated to bring the sprocket $h^5$ into engagement with the shaft $e^4$, and then the motion of the shaft $e^4$ is transmitted by the chain $h^4$ to the sprocket $h^3$, shaft $h^2$, and gear or pinion $h'$ to the collar $h$ to directly drive the sprocket $g^3$ in a direction reverse to that in which it is driven by the shaft $g$. The rear axle $b'$ is thus driven to propel the vehicle backward.

When the vehicle is to be stopped, it is necessary that not only the revolution of the rear axle $b'$ be stopped by the band-brake $b^{12}$, but the movement of the fly-wheel $f^4$ must also be checked. To thus check the fly-wheel upon an arm $b^3$, which operates the band $b^{12}$, is arranged a roller $b^{10}$, whose periphery is hollowed out or concaved to fit against the periphery of the fly-wheel. When the arm $b^3$ is advanced to tighten the band $b^{12}$, the roller $b^{10}$ is caused to press upon the fly-wheel and to check its movement or speed.

In vehicles of this class it is advantageous to have some means whereby the vehicle may be manually propelled. Thus in case of accident to the motor or before the motor has been started it may be necessary to move the vehicle into a position from which it may be started or in which it may be repaired. Again, in ascending steep grades it may also be of advantage to supplement the motor by manual propulsion. In my present invention there is included a means whereby the vehicle may be propelled manually, which means can be used either in conjunction with the motor mechanism or independently thereof. The preferred form of hand propelling means is illustrated in Figs. 1, 3, 4, 5, 6, and 7. It consists of two hand-levers $m$ and $m'$, each of which controls a mechanism and the two being duplicated for operating directly the vertical shaft $f$. This shaft $f$ has secured to it directly below the miter-gear $e^7$ a cog or gear wheel $m^2$, and meshing with this gear-wheel $m^2$ are the two gears $m^3$ and $m^4$, respectively adapted to be turned by the hand-lever $m$ or $m'$. Upon the upper face of each gear $m^3$ or $m^4$ is formed a ratchet disk or ring $m^5$, and upon the shaft or arbor $m^6$ of the gear $m^3$ or $m^4$, above the face of the said gears, is also secured or provided a second ratchet disk or ring $m^7$. The lower ratchet $m^5$ is operated in one direction by a pawl $n$, depending from a lever-arm $n'$, which is loosely pivoted at one end on the shaft or arbor $m^6$. The lever-arm $n'$ is pivotally connected by a link $n^2$ to one end of a cross or rock arm $n^3$, which is connected at its center to a rock-shaft $n^4$. From the rock-shaft $n^4$ extends an arm $n^5$, which is connected pivotally by a link or connecting rod $n^6$ to one handle or hand-lever $m$ or $m'$. When now the hand-lever is oscillated, the rock-shaft $n^4$ is rocked and the lever-arm $n'$ is advanced and retracted alternately to operate through the pawl $n$ the ratchet $m^5$. The upper ratchet $m^7$ is likewise operated or actuated in one direction by a pawl $o$, depending from a lever-arm $o'$, which is loosely pivoted at one end to the arbor or shaft $m^6$. The lever-arm $o'$ is pivotally connected by a link $o^2$ to the other cross or rock arm $n^3$. The movement of the rock-arm $n^3$, controlled, as hereinbefore explained, by the hand-levers $m$ and $m'$, will by reason of its described connection with the pawl-levers $n'$ and $o'$ operate or advance said pawls and levers in opposite directions—that is, when the pawl $n$ is operated to move or advance the ratchet the other pawl $o$ is retracted over its ratchet and is only advanced to move said ratchet at the moment the pawl $n$ ceases to operate its ratchet. There is thus secured to the shaft or arbor $m^6$ a continuous rotary movement when the hand-levers $m$ and $m'$ are either being advanced or retracted. When the hand propelling device is not used, the pawls $n$ and $o$ are elevated out of engagement with their respective ratchets as follows: The hand-levers $m$ and $m'$ are either depressed or advanced, and the connecting-rods $n^6$ are correspondingly moved. A further movement of the hand-levers $m$ or $m'$, as illustrated in dotted lines in Fig. 1, beyond the usual range of movement will cause, for instance, a rearward movement of the connecting-rod $n^6$ to the right. This unusual movement causes a finger $n^7$ on the link $n^2$ to slide under the pawl $n$ and to elevate the said pawl from engagement with its ratchet and also causes a projection $o^7$ on the link $o^2$ to ride over the free end of the pawl $o$, as illustrated in Fig. 7, to also lift the said pawl $o$ out of engagement with its ratchet.

Having thus described the nature and objects of my invention, what I claim as new, and desire to secure by Letters Patent, is—

1. In an automobile driving mechanism, two horizontally-arranged driving-shafts arranged between the motor and the driven axle of the vehicle, two vertically-arranged driving-shafts arranged intermediately of the two horizontal shafts, one of said vertical shafts being disposed centrally of the vehicle, and a fly-wheel carried by said vertical central shaft, substantially as and for the purposes described.

2. In an automobile driving mechanism, a motor, a driven axle, two horizontally-arranged driving-shafts arranged intermediately of the motor and the driven axle, two vertically-arranged driving-shafts arranged intermediately of the horizontal shafts, and one of said vertical shafts being arranged centrally of the vehicle, a fly-wheel secured to the vertical central shaft, a brake adapted to control the driven axle, and a roller carried by said brake and adapted to control the fly-wheel, substantially as and for the purposes described.

3. In an automobile or similar vehicle, the combination with the motor and driving mechanism, of a hand propelling mechanism adapted to operate conjointly with or independently of said driving mechanism, substantially as and for the purposes described.

4. In an automobile or similar vehicle, the combination with the motor and the driving mechanism controlled thereby, of a gear-wheel interposed in the driving mechanism, an oscillating hand-lever and mechanism connecting said hand-lever with the gear-wheel and adapted to transform the oscillating movement of the hand-lever into continuous rotary movement of the gear-wheel, substantially as and for the purposes described.

5. In an automobile or similar vehicle, a hand propelling mechanism, comprising a gear-wheel in mesh or series with the motor-driving mechanism, two ratchet-disks controlling the gear-wheel, two pawl-arms and their pawls adapted to operate successively the ratchet-disks to continuously rotate the gear-wheel, and an oscillating hand-lever adapted to operate each pawl-arm, pawl and ratchet-disk, alternately, substantially as and for the purposes described.

In testimony whereof I have hereunto set my signature in the presence of two subscribing witnesses.

DANIEL M. PFAUTZ.

Witnesses:
J. WALTER DOUGLASS,
THOMAS M. SMITH.